United States Patent
Helffrich et al.

(10) Patent No.: US 7,155,107 B2
(45) Date of Patent: Dec. 26, 2006

(54) SYSTEM AND METHOD FOR DETECTION OF FIBER OPTIC CABLE USING STATIC AND INDUCED CHARGE

(75) Inventors: Jerome A. Helffrich, Boerne, TX (US); Glenn M. Light, San Antonio, TX (US); Clinton J. Thwing, Bulverde, TX (US)

(73) Assignee: Southwest Research Institute, San Antonio, TX (US)

( * ) Notice: Subject to any disclaimer, the term of this patent is extended or adjusted under 35 U.S.C. 154(b) by 30 days.

(21) Appl. No.: 11/160,275

(22) Filed: Jun. 16, 2005

(65) Prior Publication Data

US 2006/0018619 A1    Jan. 26, 2006

Related U.S. Application Data

(60) Provisional application No. 60/521,694, filed on Jun. 18, 2004.

(51) Int. Cl.
G02B 6/00 (2006.01)
(52) U.S. Cl. ..................................... 385/147; 385/134
(58) Field of Classification Search ................ 385/134, 385/147
See application file for complete search history.

(56) References Cited

U.S. PATENT DOCUMENTS

| | | | |
|---|---|---|---|
| 4,652,861 A | | 3/1987 | Domes |
| 5,006,806 A | * | 4/1991 | Rippingale et al. .......... 324/326 |
| 5,017,873 A | * | 5/1991 | Rippingale et al. .......... 324/326 |
| 5,122,750 A | | 6/1992 | Rippingale et al. |
| 5,764,043 A | | 6/1998 | Czosnowski et al. |
| 6,100,699 A | | 8/2000 | Eslambolchi et al. |
| 6,141,480 A | * | 10/2000 | Simon et al. ................ 385/147 |
| 6,366,191 B1 | * | 4/2002 | Cloutier et al. .............. 335/302 |
| 6,373,252 B1 | | 4/2002 | Eslambolchi et al. |
| 6,650,798 B1 | * | 11/2003 | Russell et al. ................. 385/11 |
| 2002/0034365 A1 | | 3/2002 | Vogelsang |

* cited by examiner

*Primary Examiner*—Kevin S. Wood
(74) *Attorney, Agent, or Firm*—Taylor Russell & Russell, P.C.

(57) ABSTRACT

The system and method provides means for detecting fiber optic cable embedded within a structure such as a wall of a building. It relies upon detecting an electrical field generated by movement of static and induced electrical charged fiber optic cable contained within the building wall. The invention is particularly useful when only one side of a wall structure is accessible and there is no access to the fiber optic cable. The process comprises the steps of locating wall studs, making a small hole in the wall material between the wall studs at approximately mid height, inserting a field emitter in the small hole for generating an electrical charge on a fiber cable, inserting an air nozzle in the small hole to create fiber cable movement, and detecting an electric field generated by the movement of an electrically charged fiber cable.

26 Claims, 5 Drawing Sheets

SYSTEM AND METHOD FOR DETECTION OF FIBER OPTIC CABLE USING STATIC AND INDUCED CHARGE

This application claims benefit of U.S. Provisional Application No. 60/521,694, filed on Jun. 18, 2004.

The U.S. Government has a paid-up license in this invention and the right in limited circumstances to require the patent owner to license others on reasonable terms as provided for by the terms of Government Contract No. MDA904-01-C-2133 awarded by the Maryland Procurement Office.

BACKGROUND

The invention relates generally to detection of fiber optic cable, and more specifically to detection of fiber optic cable embedded within a structure such as a wall of a building. More particularly, the invention relates to detecting a fiber optic cable within a hollow building wall by detecting an electrical field generated by movement of a charged fiber optic cable contained within the building wall. The invention is particularly useful when only one side of a wall structure is accessible and there is no access to the fiber optic cable.

Many, if not all, fiber optic cables installed within the walls of buildings are totally non-conductive, including any strength member. The absent of conductors makes it difficult to locate cables positioned within building walls using conventional techniques. Conventional devices for detection of features embedded within a wall structure may rely on one or more diverse technologies to accomplish their purpose. Most commonly used detection techniques use capacitive, magnetic, ultrasonic and electromagnetic detectors. U.S. Pat. No. 6,215,293 discloses a device that may be used for locating a wooden object, a metal object or a live AC wire positioned behind a wall surface, as the device is moved along the wall surface. The disclosed invention uses capacitive techniques for detecting a change in dielectric constant due to embedded non-metallic features, magnetic techniques for detecting a change in reluctance due to embedded metallic features, and electromagnetic techniques for detecting radiation due to alternating current flowing in a wire. A disadvantage of the approach disclosed in this invention is the near proximity requirement between the detectors and the embedded features, due to the lack of detector sensitivity and selectivity.

Finding fiber optic cables in walls of buildings is very difficult, especially when access to only one side of the wall structure is available. An investigation was conducted of technologies that may be useful for detecting fiber cables hidden in walls with access from only one side of the wall. These technologies include (1) photon-induced positron annihilation (PIPA), (2) nuclear magnetic resonance (NMR), (3) x-ray radiography (4) dielectric measurement, (5) microwave polarization, and (6) detecting an electric field generated from a moving fiber cable that contains a static charge. The study of the PIPA approach showed that it is not applicable or practical for finding hidden fiber optic cables. Testing showed that the NMR approach is also not practical. Testing of x-ray radiography techniques showed that if access to both sides of a wall structure is available, through-transmission x-ray techniques may be used to effectively see through walls made from sheetrock up to approximately 0.50 inch thick for detection of fiber optic cables greater than 0.02 inch in diameter. The drawback of x-ray radiography techniques is that it requires access to both sides of a wall, which may not be available. Evaluation of the dielectric measurement method showed that fiber cable could be detected if it was within approximately 0.38 inch from the outside surface of a wall board, embedded in the sheetrock. In most cases, fiber optic cable is suspended in a wall and not embedded in sheetrock. Evaluation of microwave polarization techniques did indicate limited capability to detect fiber optic cable within wall structures. However, this technique showed high sensitivity to the distance between the microwave probe and the fiber cable, making this approach impractical. The most practical method for identifying fiber cables within a wall structure is detecting an electric field generated by an electrically charged fiber optic cable that is exhibiting movement.

SUMMARY

The present invention provides a system and method for detecting fiber optic cable within a wall structure using static and induced electrical charge. The concept behind the present invention is to measure an electric field that is generated by the movement of an electrically charged fiber optic cable. A constraint in designing such a sensing apparatus is having access to only one side or surface of a wall structure that may contain the fiber optic cable to be detected.

Detecting a fiber optic cable hidden behind a wall comprises a four-step process. First, wall studs must be located using an appropriate detecting device. The wall studs may be either wood or meal. Second, a 0.06-inch diameter hole is made in the wall approximately halfway between the wall studs and about midwall height, and a field emitter tip is inserted in the wall for generating ions. The field emitter tip is held at an electrical potential of approximately 50 kV, and positioned within the wall structure for about 15 minutes. Third, the field emitter tip is removed from the wall and an air nozzle is inserted into the wall through the 0.06 diameter hole. Air is then injected into the wall at a pressure of approximately 60 psi. Fourth, while positioning a field detection antenna approximately one inch from the wall and, as the air nozzle is injecting air in various directions within the wall for providing cable movement, measuring the electric field generated by the movement of the charged fiber optic cable.

An object of the invention is to provide a portable electric field detection antenna, based on an electrometer amplifier connected to a horizontal wire or patch electrode positioned an appropriate height above a ground plane for detecting a fiber optic cable hidden behind a wall, the fiber optic cable having a residual charge and being intentionally moved during the detection process.

Another object of the invention is using a charging device inserted within a wall structure to fill the space within the wall with ions that attach to a fiber optic cable within the wall, replacing the charging device with a directional air nozzle within the wall for providing movement to the fiber optic cable, and using a charge detection antenna to detect an electric field generated by movement of the electrically charged fiber optic cable within the wall structure.

An embodiment of the present invention is a method for detecting fiber optic cable embedded within a structure, the structure including internal support members and at least one wall having an internal surface affixed to the support members and an opposite accessible external surface, the method comprising the steps of inserting a tip of an electrostatic field emitter through the wall from the accessible wall surface to a location between the support members affixed to the internal surface, activating the tip of the electrostatic field emitter with a high voltage for a sufficient time to induce an electrostatic charge on any fiber optic cable located between the support members, injecting high pressure air through an air nozzle inserted into the structure from the accessible wall surface at the location between the support members for causing movement of any fiber optic cable located between the support members, and detecting the presence of any fiber optic cable by positioning an electric field detector near the accessible wall surface for measuring an electric field generated by the movement of any electrostatically charged fiber cable located between the support members. The method may further comprise the step of identifying locations of the support members of the structure from the accessible surface, the support members containing no fiber optic cable. The method may further comprise the step of removing the tip of the electrostatic field emitter from the wall and inserting the air nozzle through the wall from the accessible wall surface to the location between the support members. The method may further comprise the step of providing user access to at least one surface of the structure. The step of inserting a tip of an electrostatic field emitter may further comprise the step of producing a small diameter hole in the wall halfway between the support members and at approximately midwall height, and inserting the tip of the electrostatic field emitter through the hole. The step of producing a small diameter hole and inserting the tip of the electrostatic field emitter may further comprise the step of removing the tip of the electrostatic field emitter from the wall and inserting the air nozzle through the hole. The step of activating the tip of the electrostatic field emitter may further comprise the step of activating the tip of the electrostatic field emitter for generating ions. The step of injecting high-pressure air through an air nozzle may further comprise the step of injecting high-pressure air through an air nozzle into the structure and manipulating the nozzle to provide a directional airflow in multiple directions within the structure for causing fiber optic cable movement. The method may further comprise the step of identifying the location of the fiber optic cable by positioning the electric field detector for maximum electric field strength.

Another embodiment of the present invention is a system for detecting fiber optic cables embedded within a wall structure, the structure including internal support members and at least one wall having an internal surface affixed to the support members and an opposite accessible external surface, the system comprising a tip of an electrostatic field emitter inserted through the wall from the accessible wall surface to a location between the support members affixed to the internal surface, the tip of the electrostatic field emitter activated with a high voltage for a sufficient time to induce an electrostatic charge on any fiber optic cable located between the support members, high pressure air being injected through an air nozzle inserted into the structure from the accessible wall surface at the location between the support members for causing movement of any fiber optic cable located between the support members, and an electric field detector positioned near the accessible wall surface for detecting the presence of any fiber optic cable by measuring an electric field generated by the movement of any electrostatically charged fiber cable located between the support members. The system may further comprise identified locations of the support members of the structure from the accessible surface, the support members containing no fiber optic cable. The system may further comprise the tip of the electrostatic field emitter removed from the wall and the air nozzle inserted through the wall from the accessible wall surface to the location between the support members. The system may further comprise a user access to at least one surface of the structure. The tip of an electrostatic field emitter inserted through the wall may further comprise a small diameter hole in the wall halfway between the support members and at approximately midwall height for inserting the tip of the electrostatic field emitter through the hole. The small diameter hole for inserting the tip of the electrostatic field emitter may further comprise the tip of the electrostatic field emitter being replaced in the wall by insertion of the air nozzle through the hole. The tip of the electrostatic field emitter activated may further comprise the tip of the electrostatic field emitter activated for generating ions. The high pressure air injected through an air nozzle may further comprise the high pressure air injected through an air nozzle into the structure and the nozzle manipulated to provide a directional airflow in multiple directions within the structure for causing fiber optic cable movement. The system may further comprise the electric field detector positioned for maximum electric field strength to identify the location of the fiber optic cable.

Yet another embodiment of the present invention is a method for detecting fiber optic cable embedded within a structure, comprising the steps of inserting a charging device within a structure to fill a space within the structure with ions that attach to a fiber optic cable within the structure, replacing the charging device with a directional air nozzle within the structure for causing movement to the fiber optic cables within the structure, and using a charge detection device, detecting an electric field generated by movement of the electrically charged fiber optic cable within the structure. The step of using a charge detection device may further comprise positioning a horizontal wire above a ground plane for detecting an electric field generated by movement of the electrically charged fiber optic cable within the structure, connecting the horizontal wire to an input of an electrometer amplifier and connecting an output of the electrometer amplifier to an indicating device for displaying the strength of the electric field generated by movement of the electrically charged fiber optic cable. The horizontal may be a patch electrode. The step of inserting a charging device may comprise the step of inserting a hardened metallic tip of a high voltage probe within the wall structure, encasing a non-inserted part of the high voltage probe in an insulating material, and electrically connecting the hardened metallic tip to a high voltage source.

And yet another embodiment of the present invention is a system for detecting fiber optic cable embedded within a structure, comprising a charging device inserted within a structure to fill a space within the structure with ions that attach to a fiber optic cable within the structure, the charging device replaced with a directional air nozzle within the structure for causing movement to the fiber optic cables within the structure, and a charge detection device for detecting an electric field generated by movement of the electrically charged fiber optic cable within the structure. The charge detection device may further comprise a horizontal wire positioned above a ground plane for detecting an electric field generated by movement of the electrically charged fiber optic cable within the structure, the horizontal wire connected to an input of an electrometer amplifier, and an output of the electrometer amplifier connected to an indicating device for displaying the strength of the electric field generated by movement of the electrically charged fiber optic cable. The horizontal may be a patch electrode. The charging device may comprise a hardened metallic tip of a high voltage probe inserted within the wall structure, a non-inserted part of the high voltage probe encases in an insulating material, and the hardened metallic tip electrically connected to a high voltage source.

BRIEF DESCRIPTION OF THE DRAWINGS

These and other features, aspects and advantages of the present invention will become better understood with regard to the following description, appended claims, and accompanying drawings wherein:

DETAILED DESCRIPTION OF THE DRAWINGS

Figure 1:
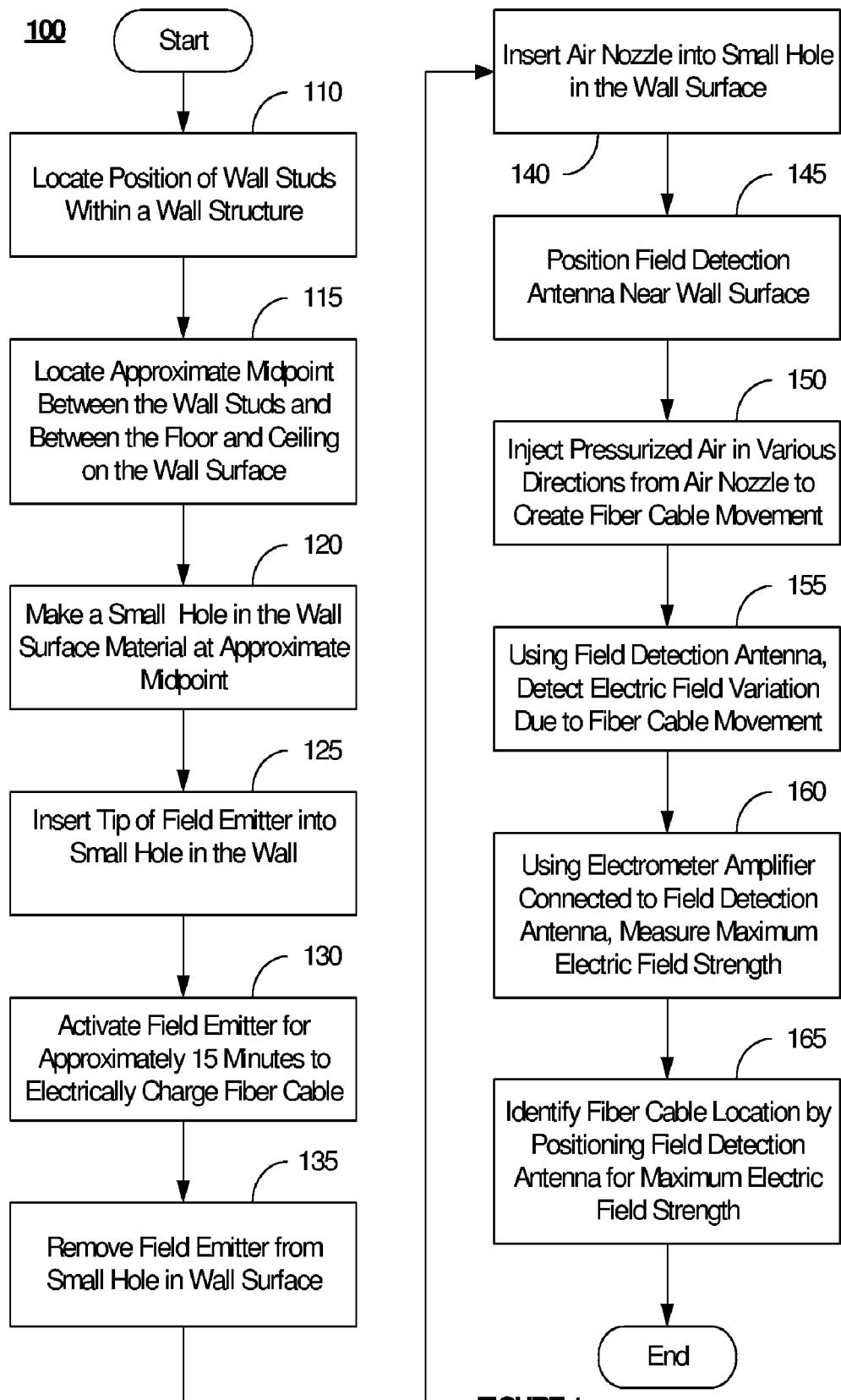
FIG. 1 shows a flow diagram of the method according to the present invention.

Turning now to FIG. 1, FIG. 1 shows a flow diagram 100 of the method according to the present invention. It is first necessary to locate the wall studs within the wall structure 110 in order to determine approximately where the midpoint is located on the wall surface between the wall studs and between the floor and ceiling 115. A small hole having a diameter of typically 1/16 inch in diameter is then made in the wall surface material at the approximate midpoint 120, and a tip of a field emitter is inserted into the small hole 125. The field emitter is activated by applying approximately 50 kV to the field emitter tip for a period of approximately 15 minutes to electrically charge a fiber optic cable if present within the wall 130, after which the field emitter is removed from the small hole in the wall surface 135. After removal of the field emitter, an air nozzle is inserted into the small hole in the wall surface 140 and the field detection antenna is positioned typically one inch near the wall surface 145. Pressurized air of typically 60 psi is injected into the air nozzle for distribution in various directions to create fiber cable movement 150. A field detection antenna is used to detect an electrical field variation generated if a moving and charged fiber optic cable is present in the wall structure 155, and an electrometer amplifier connected to the field detection antenna is used to measure electric field strength 160. By positioning the horizontally oriented field detection antenna for maximum electric field strength indication, a location of a fiber optic cable location may be identified 165. Since a charged fiber optic cable may be represented as a line charge, if a charged fiber optic cable is present within a wall structure, the field detection antenna will detect an electric field due to the movement of the charged fiber optic cable.

Figure 2:
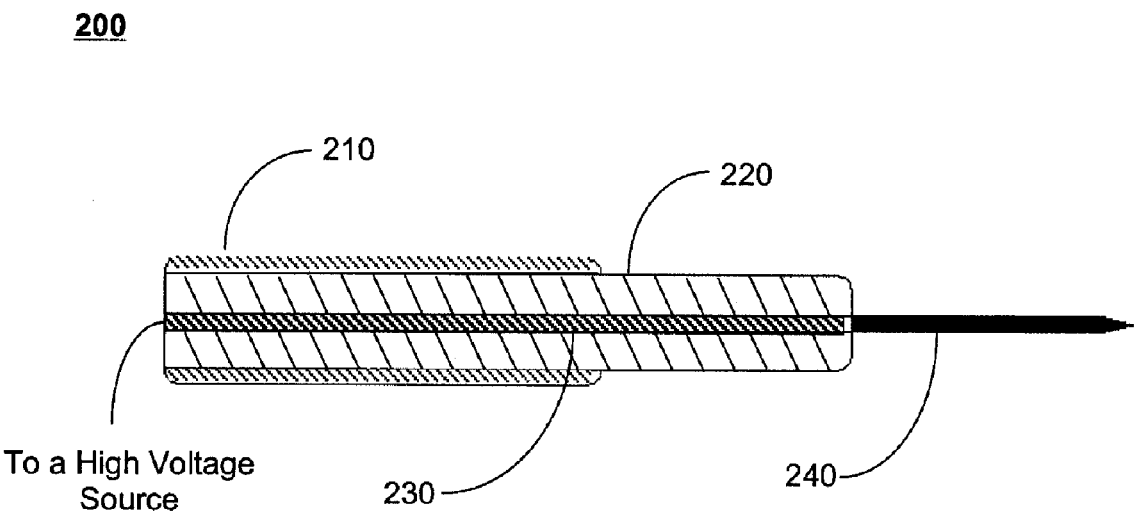
FIG. 2 shows a configuration of a field emitter tip.

Turning to FIG. 2, FIG. 2 shows a configuration of a field emitter 200. As noted above, the field emitter 200 is inserted into a small opening in a wall for approximately 15 minutes to electrically charge a fiber cable positioned within the wall. The field emitter 200 comprises a hardened metallic tip 240, such as tungsten steel, which is shaped to a point for producing large amounts of ions needed to charge a fiber cable. The hardened metallic tip 240 is embedded in a primary insulation 220 that is encased within a secondary insulation 210. Within the primary insulation, the hardened metallic tip is connected to a wire 230 that is connected to a high voltage source for producing electrically charged ions.

Figure 3A:
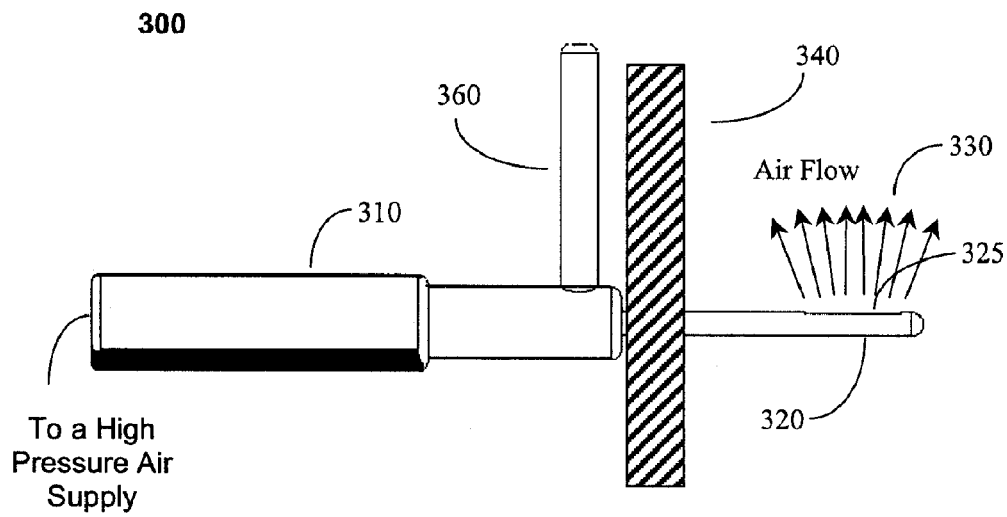
FIG. 3 shows an air nozzle for providing movement to a fiber optic cable.
Figure 3B:
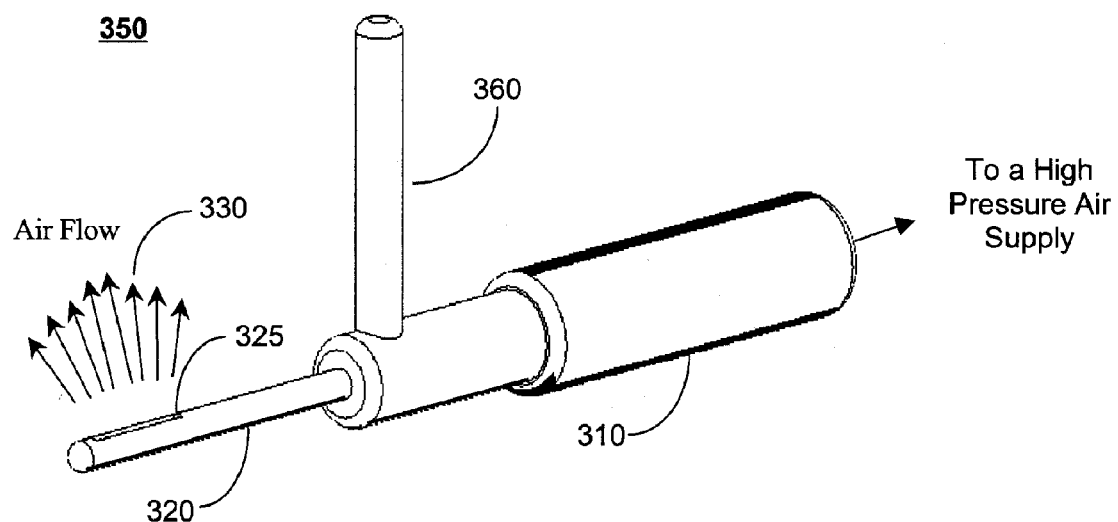

Turning to FIG. 3, FIG. 3A shows an air nozzle 300 inserted into an opening in a wall 340 for providing movement to a fiber optic cable positioned within the wall by the movement of air flow 330 from an aperture 325 in the tip of the air nozzle 320. The direction of air flow 330 may be radially adjusted by rotating the air nozzle handle 310 in various directions using the shaft 360. The direction of the air flow 330 can be monitored by a position of the handle 360. The air nozzle 300 is connected to a high-pressure air supply for providing the airflow 330, and is typically constructed of brass material. FIG. 3B shows a perspective view 350 of the air nozzle as in FIG. 3A, providing the shaft 360 extending at a right angle from an axis of the air nozzle handle 310 in a radial direction that parallels the direction of airflow 330 from the tip of the air nozzle 320. As described above, the airflow from the nozzle tip 320 produces movement of any charged fiber cables within a wall for detection by the field detection antenna. A variation of the described technique may use a pulsed air supply to provide fiber cable movement.

Figure 4A:
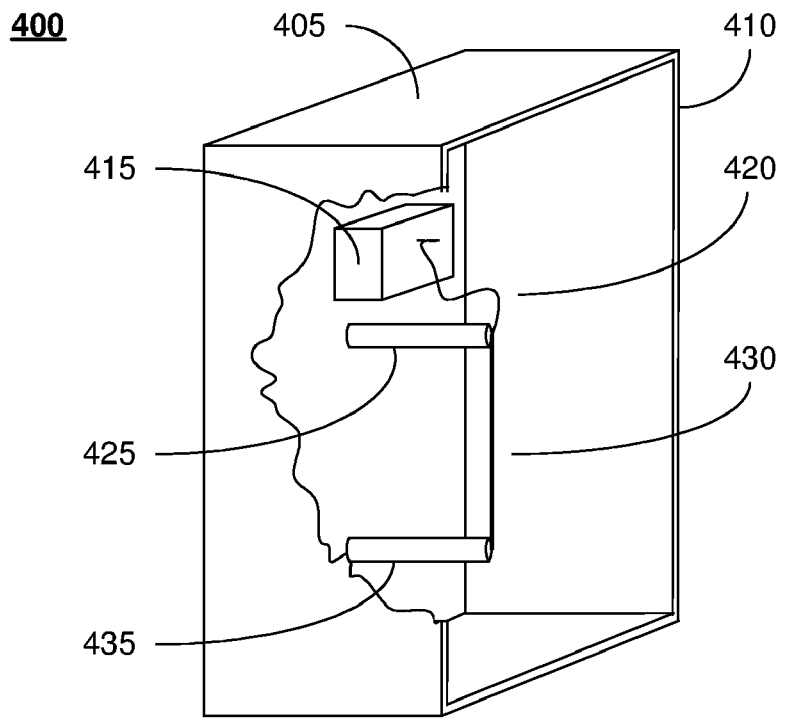
FIG. 4 shows a schematic representation of an electric field detection antenna positioned against a wall structure containing a fiber optic cable.
Figure 4B:
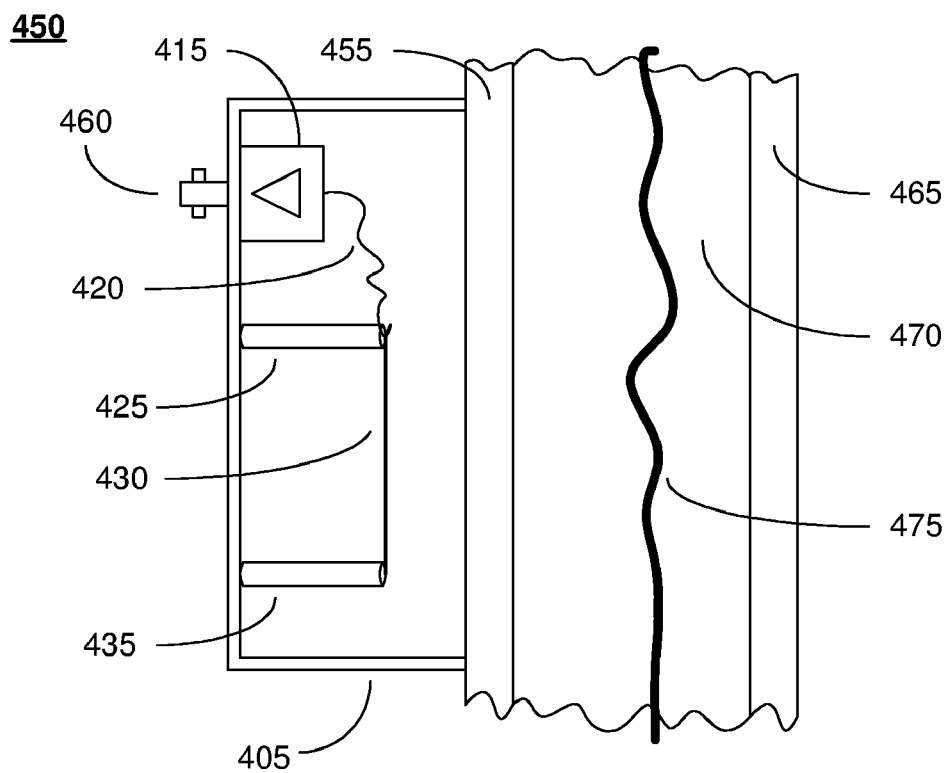

Turning to FIG. 4, FIG. 4A shows a cut-away perspective view of an electric field detector 400 and FIG. 4B shows a side cut-away view of the electric field detector 450 positioned against a wall 455 for detecting movement of electrically charge fiber cables positioned within the wall. The electric field detector shown in FIG. 4A and FIG. 4B comprises a five-sided conductive enclosure 405 for shielding an electric field detecting antenna 430 positioned on insulated standoffs 425, 435 within the five-sided enclosure 405. The edges 410 of the five-sided conductive enclosure 405 may include carbon fiber brushes to seal the conductive enclosure 405 against the wall 455. One end of the antenna 430 is electrically connected to an electrometer amplifier 415 by a wire 420 for amplifying the detected signal from the antenna 430. The output of the electrometer amplifier 415 is connected to a connector 460 mounted on the five-sided conductive enclosure. FIG. 4B also shows a fiber cable 475 positioned within a wall space 470 between two pieces of sheetrock or similar material 455, 465. When the charged fiber cable 470 is caused to move by airflow from the air nozzle, the antenna 430 detects the change in electric field due to the charged cable movement, which is amplified by the electrometer amplifier 415 and fed to an indicating device for providing cable position. By positioning the electric field detector 400, 450 at various points on a wall 455, the position of a fiber cable may be identified and plotted.

Figure 5A:
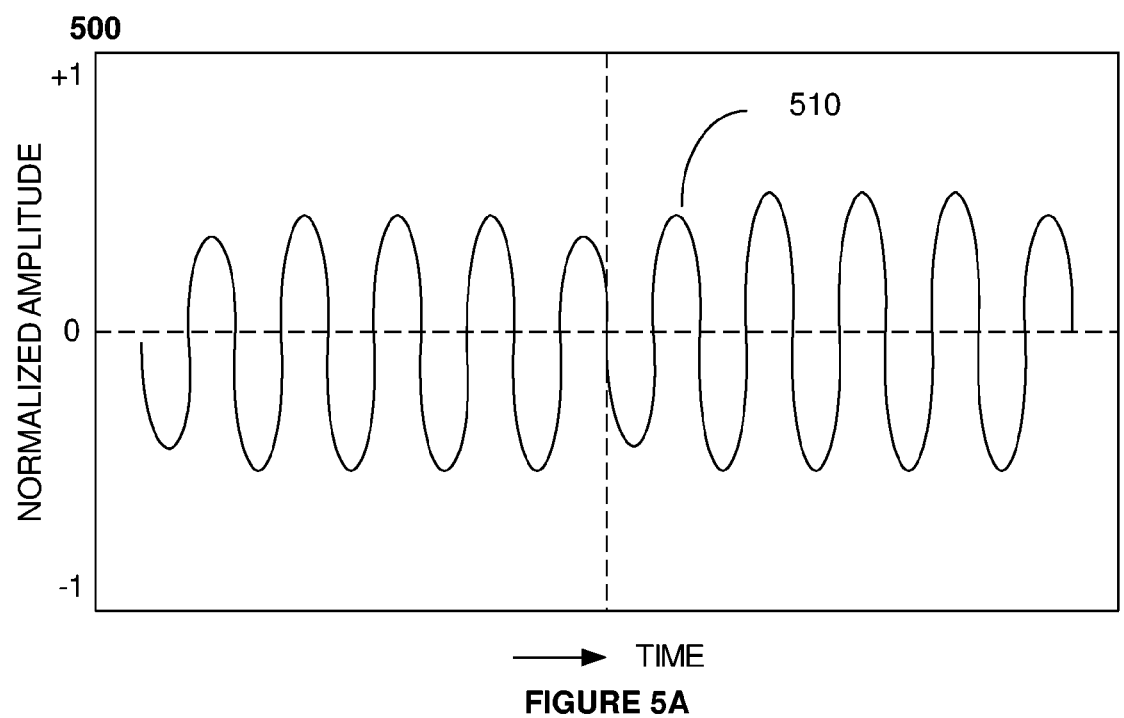
FIG. 5 shows representations of signals from an electrometer amplifier with and without an embedded fiber optic cable according to the present invention.
Figure 5B:
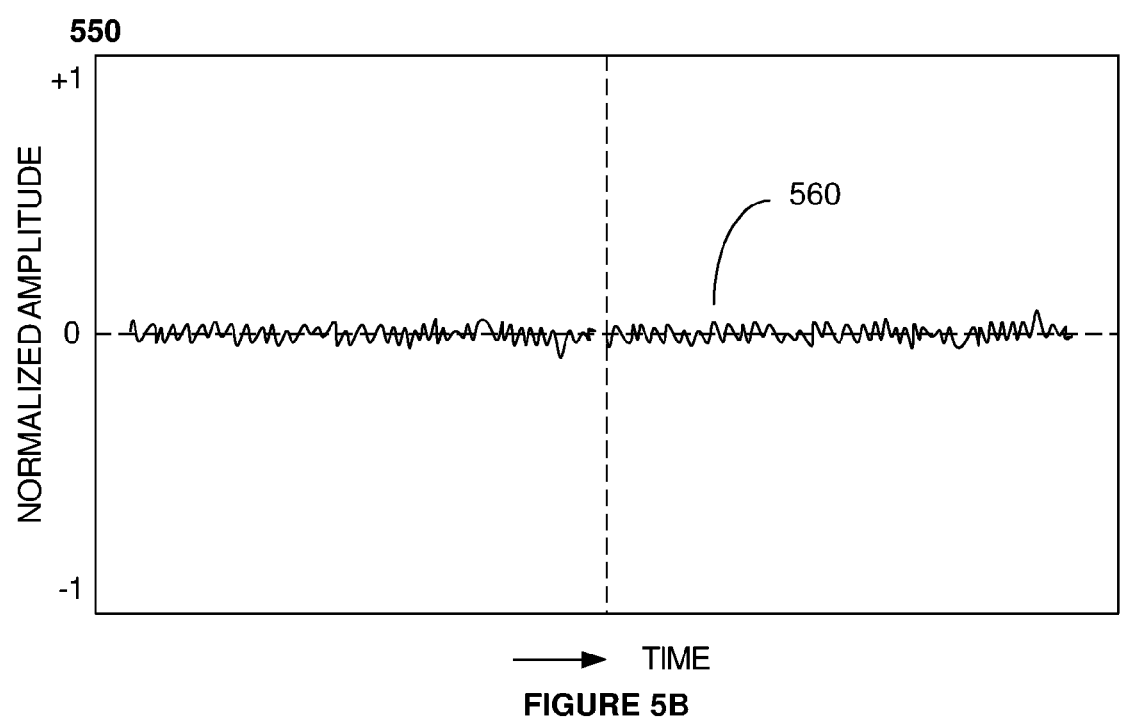

Turning to FIG. 5, FIG. 5A shows a representative signal 510 from an electrometer amplifier with an embedded fiber optic cable embedded within a wall according to the present invention. The signal 510 shows the result of charged fiber movement due to injected air flow. FIG. 5B shows a representative signal 560 from an electrometer amplifier without an embedded fiber optic cable embedded within a wall according to the present invention. There are several parameters that affect the ability of the present invention to detect fiber optic cables within a wall structure. One of these parameters is the amount of charge that can be applied to the fiber using either a field emitter tip or an ionizing bar. A field emitter tip produces better results than an ionizing bar. Another parameter is the amount of charge that the fiber is able to hold, which depends on the cable jacket material. For example, if the fiber cable jacket material is metal, the amount of charge that the fiber is able to hold is small. If the fiber cable jacket material is PVC, the amount of charge that the fiber is able to hold is large. Yet a third parameter is the distance that the fiber must be made to move. Generally, a ½ inch displacement of the fiber cable provides for suitable detection.

Although the present invention has been described in detail with reference to certain preferred embodiments, it should be apparent that modifications and adaptations to those embodiments might occur to persons skilled in the art without departing from the spirit and scope of the present invention.

What is claimed is:

1. A method for detecting fiber optic cable embedded within a structure, the structure including internal support members and at least one wall having an internal surface affixed to the support members and an opposite accessible external surface, the method comprising the steps of:
    inserting a tip of an electrostatic field emitter through the wall from the accessible wall surface to a location between the support members affixed to the internal surface;
    activating the tip of the electrostatic field emitter with a high voltage for a sufficient time to induce an electrostatic charge on any fiber optic cable located between the support members;
    injecting high pressure air through an air nozzle inserted into the structure from the accessible wall surface at the location between the support members for causing movement of any fiber optic cable located between the support members; and
    detecting the presence of any fiber optic cable by positioning an electric field detector near the accessible wall surface for measuring an electric field generated by the movement of any electrostatically charged fiber cable located between the support members.

2. The method of claim 1, further comprising the step of identifying locations of the support members of the structure from the accessible surface, the support members containing no fiber optic cable.

3. The method of claim 1, further comprising the step of removing the tip of the electrostatic field emitter from the wall and inserting the air nozzle through the wall from the accessible wall surface to the location between the support members.

4. The method of claim 1, further comprising the step of providing user access to at least one surface of the structure.

5. The method of claim 1, wherein the step of inserting a tip of an electrostatic field emitter further comprises the step of producing a small diameter hole in the wall halfway between the support members and at approximately midwall height, and inserting the tip of the electrostatic field emitter through the hole.

6. The method of claim 5, wherein the step of producing a small diameter hole and inserting the tip of the electrostatic field emitter further comprises the step of removing the tip of the electrostatic field emitter from the wall and inserting the air nozzle through the hole.

7. The method of claim 1, wherein the step of activating the tip of the electrostatic field emitter further comprises the step of activating the tip of the electrostatic field emitter for generating ions.

8. The method of claim 1, wherein the step of injecting high pressure air through an air nozzle further comprises the step of injecting high pressure air through an air nozzle into the structure and manipulating the nozzle to provide a directional airflow in multiple directions within the structure for causing fiber optic cable movement.

9. The method of claim 1, further comprising the step of identifying the location of the fiber optic cable by positioning the electric field detector for maximum electric field strength.

10. A system for detecting fiber optic cables embedded within a wall structure, the structure including internal support members and at least one wall having an internal surface affixed to the support members and an opposite accessible external surface, the system comprising:
    a tip of an electrostatic field emitter inserted through the wall from the accessible wall surface to a location between the support members affixed to the internal surface;
    the tip of the electrostatic field emitter activated with a high voltage for a sufficient time to induce an electrostatic charge on any fiber optic cable located between the support members;
    high pressure air being injected through an air nozzle inserted into the structure from the accessible wall surface at the location between the support members for causing movement of any fiber optic cable located between the support members; and
    an electric field detector positioned near the accessible wall surface for detecting the presence of any fiber optic cable by measuring an electric field generated by the movement of any electrostatically charged fiber cable located between the support members.

11. The system of claim 10, further comprising identified locations of the support members of the structure from the accessible surface, the support members containing no fiber optic cable.

12. The system of claim 10, further comprising the tip of the electrostatic field emitter removed from the wall and the air nozzle inserted through the wall from the accessible wall surface to the location between the support members.

13. The system of claim 10, further comprising a user access to at least one surface of the structure.

14. The system of claim 10, wherein a tip of an electrostatic field emitter inserted through the wall further comprises a small diameter hole in the wall halfway between the support members and at approximately midwall height for inserting the tip of the electrostatic field emitter through the hole.

15. The system of claim 14, wherein small diameter hole for inserting the tip of the electrostatic field emitter further comprises the tip of the electrostatic field emitter being replaced in the wall by insertion of the air nozzle through the hole.

16. The system of claim 10, wherein the tip of the electrostatic field emitter activated further comprises the tip of the electrostatic field emitter activated for generating ions.

17. The system of claim 10, wherein the high pressure air injected through an air nozzle further comprises the high pressure air injected through an air nozzle into the structure and the nozzle manipulated to provide a directional airflow in multiple directions within the structure for causing fiber optic cable movement.

18. The system of claim 10, further comprising the electric field detector positioned for maximum electric field strength to identify the location of the fiber optic cable.

19. A method for detecting fiber optic cable embedded within a structure, comprising the steps of:
    inserting a charging device within a structure to fill a space within the structure with ions that attach to a fiber optic cable within the structure;

replacing the charging device with a directional air nozzle within the structure for causing movement to the fiber optic cables within the structure; and using a charge detection device, detecting an electric field generated by movement of the electrically charged fiber optic cable within the structure.

20. The method of claim 19, wherein the step of using a charge detection device further comprises:

positioning a horizontal wire above a ground plane for detecting an electric field generated by movement of the electrically charged fiber optic cable within the structure;

connecting the horizontal wire to an input of an electrometer amplifier; and connecting an output of the electrometer amplifier to an indicating device for displaying the strength of the electric field generated by movement of the electrically charged fiber optic cable.

21. The method of claim 20, wherein the horizontal is a patch electrode.

22. The method of claim 19, wherein the step of inserting a charging device comprises the step of:

inserting a hardened metallic tip of a high voltage probe within the wall structure;

encasing a non-inserted part of the high voltage probe in an insulating material; and electrically connecting the hardened metallic tip to a high voltage source.

23. A system for detecting fiber optic cable embedded within a structure, comprising:

a charging device inserted within a structure to fill a space within the structure with ions that attach to a fiber optic cable within the structure;

the charging device being replaced with a directional air nozzle within the structure for causing movement to the fiber optic cables within the structure; and a charge detection device for detecting an electric field generated by movement of the electrically charged fiber optic cable within the structure.

24. The system of claim 23, wherein the charge detection device further comprises:

a horizontal wire positioned above a ground plane for detecting an electric field generated by movement of the electrically charged fiber optic cable within the structure;

the horizontal wire connected to an input of an electrometer amplifier; and an output of the electrometer amplifier connected to an indicating device for displaying the strength of the electric field generated by movement of the electrically charged fiber optic cable.

25. The system of claim 24, wherein the horizontal wire is a patch electrode.

26. The method of claim 23, wherein the charging device comprises:

a hardened metallic tip of a high voltage probe inserted within the wall structure;

a non-inserted part of the high voltage probe encases in an insulating material; and the hardened metallic tip electrically connected to a high voltage source.

* * * * *